(12) United States Patent
Frede

(10) Patent No.: US 8,107,131 B2
(45) Date of Patent: Jan. 31, 2012

(54) SCANNER FOR OPTICALLY AND ELECTRICALLY SCANNING TRANSPONDER-EQUIPPED DOCUMENT

(75) Inventor: Martin Frede, Meersburg (DE)

(73) Assignee: Open Text S.A., Grand Duchy (LU)

( * ) Notice: Subject to any disclaimer, the term of this patent is extended or adjusted under 35 U.S.C. 154(b) by 1011 days.

(21) Appl. No.: 12/063,723

(22) PCT Filed: Aug. 24, 2006

(86) PCT No.: PCT/EP2006/065614
§ 371 (c)(1),
(2), (4) Date: Feb. 13, 2008

(87) PCT Pub. No.: WO2007/025927
PCT Pub. Date: Mar. 8, 2007

(65) Prior Publication Data
US 2008/0309987 A1    Dec. 18, 2008

(30) Foreign Application Priority Data
Aug. 29, 2005 (DE) .......................... 10 2005 040 852

(51) Int. Cl.
*H04N 1/00* (2006.01)

(52) U.S. Cl. ........ 358/435; 358/474; 358/501; 358/494; 235/375

(58) Field of Classification Search .................. 358/474, 358/435, 298, 501, 586, 494, 486, 436; 235/375
See application file for complete search history.

(56) References Cited

U.S. PATENT DOCUMENTS

| | | | |
|---|---|---|---|
| 5,382,784 A * | 1/1995 | Eberhardt | 235/462.46 |
| 5,604,606 A | 2/1997 | Miyashita et al. | |
| 5,696,616 A | 12/1997 | Wagensonner | |
| 6,008,813 A * | 12/1999 | Lauer et al. | 345/424 |
| 6,088,133 A * | 7/2000 | Francis et al. | 358/473 |
| 6,710,891 B1 * | 3/2004 | Vraa et al. | 358/1.12 |
| 6,827,279 B2 * | 12/2004 | Teraura | 235/492 |
| 7,073,712 B2 * | 7/2006 | Jusas et al. | 235/451 |
| 7,142,118 B2 * | 11/2006 | Hamilton et al. | 340/572.1 |
| 7,746,511 B2 * | 6/2010 | Hamilton et al. | 358/474 |
| 2002/0170973 A1 | 11/2002 | Teraura | |

(Continued)

FOREIGN PATENT DOCUMENTS

| | | |
|---|---|---|
| DE | 44 16 314 | 6/1997 |
| EP | 0 762 176 | 3/1997 |
| JP | 2001-24845 | 1/2001 |

(Continued)

OTHER PUBLICATIONS

Hascher, W. Identifikation Mit Mini-Chips. In: Elektronik, 2003, Issue 19, vol. 50-55—Partial Translation.

*Primary Examiner* — Negussie Worku
(74) *Attorney, Agent, or Firm* — Sprinkle IP Law Group

(57) ABSTRACT

In a scanner for optical and electrical scanning of a document having a transponder associated therewith a glass plate is provided for placement of the document. An optical scanning device scans the document via a mirror. At least one antenna for transmission of electromagnetic signals to the transponder and for reception of electromagnetic signals from the transponder is provided.

13 Claims, 3 Drawing Sheets

U.S. PATENT DOCUMENTS

| | | |
|---|---|---|
| 2003/0163696 A1 | 8/2003 | Rancien |
| 2005/0035847 A1* | 2/2005 | Bonalle et al. ............... 340/5.61 |
| 2005/0141004 A1 | 6/2005 | Kiwada |
| 2005/0237582 A1* | 10/2005 | Hamilton et al. ............. 358/474 |
| 2007/0036558 A1* | 2/2007 | Huss et al. ........................ 399/8 |
| 2008/0074713 A1* | 3/2008 | Nakawaki ..................... 358/474 |

FOREIGN PATENT DOCUMENTS

| | | |
|---|---|---|
| JP | 2003-248802 A | 9/2003 |
| WO | WO 94/18642 | 8/1994 |
| WO | WO 00/67193 | 11/2000 |
| WO | WO 03/077196 | 9/2003 |

* cited by examiner

SCANNER FOR OPTICALLY AND ELECTRICALLY SCANNING TRANSPONDER-EQUIPPED DOCUMENT

CROSS-REFERENCE TO RELATED APPLICATION(S)

This application is a U.S. National Phase of International Application No. PCT/EP2006/065614 filed on Aug. 24, 2006, entitled SCANNER FOR OPTICALLY AND ELECTRICALLY SCANNING TRANSPONDER-EQUIPPED DOCUMENT, which application is hereby incorporated by reference in its entirety.

BACKGROUND

The preferred embodiment concerns a device for optical and electrical scanning of transponder-containing documents.

Optical scanners are used for scanning of identification documents such as passports, personal identification and the like. An image file is generated with the scanners, from which image file data either data are extracted automatically (for example by means of an OCR method) and compared with a database or the image file is displayed on one or more apparatuses where it can be manually compared with a present database by monitoring personnel. By now transponders are also integrated into such identification documents. Transponders are semiconductor memories that are provided with a communication device so that their data content can be read out by means of radio waves and possibly can be altered.

Known optical scanners for scanning of documents comprise a glass plate for placement of the respective document and an optical scanning device that can scan the document lying on the glass plate by means of a mirror arranged below the glass plate. The mirror typically possesses a reflecting metal layer. If it is desired to arrange an antenna for transmission and reception of radio waves in such a scanner, the transmission power and reception power would be significantly attenuated by the metal layer of the mirror since they form exposures in the metal layer due to the radio waves. Tests have shown that no reliable reading of RFID transponders is possible with such an arrangement when the mirror is arranged in proximity to the antenna.

A device for copying and printing arises from US 2002/0170973 A1, which device for copying and printing comprises a printing station in which is arranged a glass plate under which is located a scanning device for optical scanning of documents lying on the glass plate. Furthermore, a cover that is equipped with an automatic paper feed is arranged atop the glass plate. The cover comprises a further optical scanning device. Furthermore, two write/read devices for writing or reading of RFID signals are provided in the cover. A further write/read device for RFID signals is arranged in the printing station. Paper webs that comprise an RFID transponder can be scanned both optically and electrically, copied optically and electrically and printed optically and electrically with this device. Various applications for transponder chips are described in the publication by W. Hascher, "Identifikation mit Mini-Chips", Elektronic, 2003, Issue 19, pages 50 through 55.

WO 03/077196 A1 concerns a method, an apparatus system and a computer program for production and tracking of a printed document with a unique identifier. A data medium with an individual recognition feature that is electronically readable, erasable, modifiable and/or writable at least in part without contact is attached on a recording medium. The recording medium is printed with information and data are written into the data medium in the course of the document processing procedure, wherein data of a user program, of the printed document and/or of the data medium are linked in a file.

U.S. Pat. No. 6,088,133 described a device for scanning of identification documents such as, for example, passports, personal identification, driver's licenses etc. This device is characterized by a special mirror arrangement that displays the entire surface of a document to the scanned on a camera, whereby no moving parts whatsoever are necessary. Neither the mirror nor the camera nor the light source is hereby moved.

A device for automatic detection of falsified identification documents arises from JP 2003-248802 A. This device comprises an optical scanner and a reader for reading of an identification chip integrated into the identification. The photo contained in the identification is optically recorded with the optical scanner and an image file showing the face of the user is simultaneously read out from the identification chip. Both images are automatically compared in order to establish differences herein.

A scanner for optical and electrical scanning of a document comprising an IC chip is known from JP 2001-24845 A.

A scanner with controllable, movable mirror elements (what is known as a digital micro-mirror device (DMD)) is known from DE 44 16 314 C2.

Reference is herewith made to the aforementioned documents and their content is incorporated into the present application.

SUMMARY

It is an object to develop a scanner for optical scanning of documents (in particular identification documents) such that the electrical scanning of transponder-comprising documents is also possible with such a scanner.

In a scanner for optical and electrical scanning of a document having a transponder associated therewith a glass plate is provided for placement of the document. An optical scanning device scans the document via a mirror. At least one antenna for transmission of electromagnetic signals to the transponder and for reception of electromagnetic signals from the transponder is provided.

DESCRIPTION OF THE PREFERRED EMBODIMENT

Figure 1:
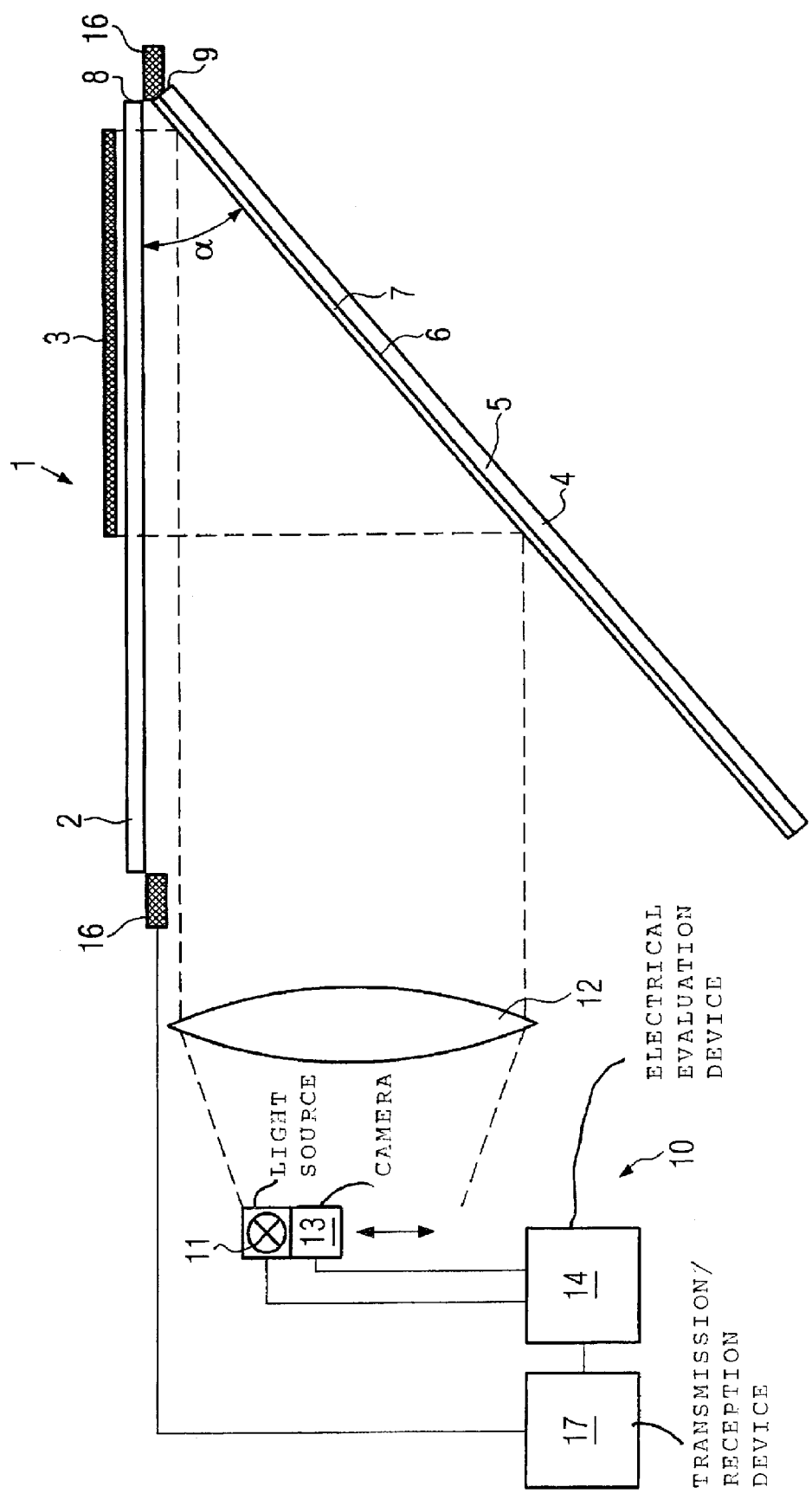
FIG. 1 illustrates schematically, the significant elements of a scanner according to the preferred embodiment.

For the purposes of promoting an understanding of the principles of the invention, reference will now be made to the preferred embodiment/best mode illustrated in the drawings and specific language will be used to describe the same. It will nevertheless be understood that no limitation of the scope of the invention is thereby intended, and such alterations and further modifications in the illustrated device and such further applications of the principles of the invention as illustrated as would normally occur to one skilled in the art to which the invention relates are included.

The scanner of the preferred embodiment for optical and electrical scanning of transponder-comprising documents comprises a glass plate for placement of the documents, an optical scanning unit that can scan a document lying on the glass plate via a mirror arranged below the glass plate, and at least one antenna for transmission of electromagnetic signals to the transponder and for reception of electrical signals from the transponder.

The scanner of the preferred embodiment is characterized in that the mirror comprises an optically reflective metal layer that is divided into separate mirror segments.

Due to the division of the metal layer into individual mirror segments, eddy currents cannot form with an intensity that appreciably impairs the radio waves. The transmission of the radio waves between the antenna and the transponder is hereby not impaired. Surprisingly, it has been shown that barely any or no optical information is lost when the divider regions between the individual mirror segments are not too large. It is therefore appropriate that the mirror segments are spaced not further than 50 µm from one another and advantageously not further than 20 µm to 30 µm from one another. This separation of the mirror segments by not more than 50 µm has proven to be suitable given a scanner with a resolution of 320 dpi. Given a resolution of 320 dpi, the diameter of a pixel is approximately 80 µm. In principle the distance between two adjacent mirror segments or the width of the divider regions is somewhat smaller than the diameter of the pixel to be detected with the scanner. Given a low resolution in which the pixels are larger, the separation can therefore be set somewhat larger, contrary to which it should be set smaller given a higher resolution.

The document is merely detected with a slight brightness in the divider regions between the individual mirror segments. This can be corrected automatically in the post-processing of the image data.

It has been shown that band-shaped mirror segments that extend across almost the entire width of the mirror already enable a reliable scanning of the transponder. However, the mirror segments are advantageously small rectangular segments with a maximum width of 10 mm and a maximum length of 15 mm. The radio waves are detrimentally affected in no way at all by such small mirror segments.

Instead of a mirror with a metal layer divided into a plurality of mirror segments, a mirror with a reflecting dielectric layer can also be provided. However, such a mirror is significantly more complicated in terms of production and is therefore more expensive than a mirror with a metal layer.

FIG. 1 schematically shows a scanner 1, whereby the elements that are naturally (for an average man skilled in the art) provided at a scanner and are not absolutely necessary for the average man skilled in the art for understanding of the present preferred embodiment (such as, for example, a housing or a cover for covering the documents to be scanned) are omitted.

The scanner 1 comprises a glass plate 2 on which a document 3 to be scanned can be placed. A mirror 4 is arranged below the glass plate 2. The mirror 4 is formed from a glass substrate 5, a metal layer 6 vapor-deposited on it and a protective layer 7.

Both the glass plate 2 and the mirror 4 are designed as rectangles in plan view. They are respectively arranged adjacent to one another with a border edge 8 or 9, whereby the mirror 4 exhibits an angle relative to the horizontally arranged glass plate 2 such that the glass plate 2 and the mirror 4 encompass an angle α. The angle α is typically 45° in order to deflect light rays from an optical scanning device 10 through the glass plate 2 onto the document 3 and to deflect light reflected from the document 3 back again to the optical scanning device.

Figure 2:
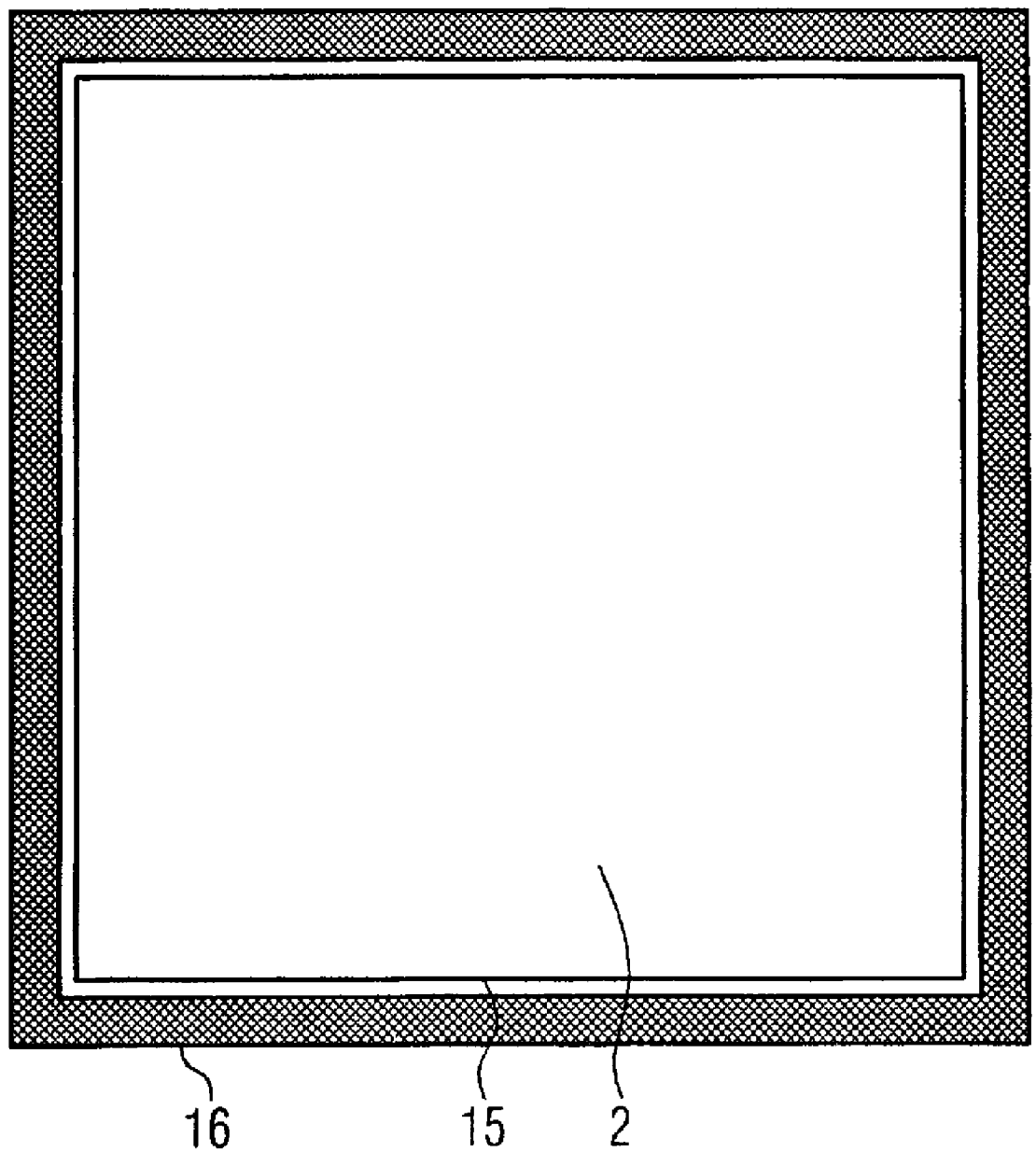
FIG. 2 shows in plan view, the glass plate and the antenna of the scanner from FIG. 1.

The optical scanning device comprises a light source 11, an objective 12 (which here is represented by only a single lens, however can comprise a plurality of lenses), a camera 13 and an electrical evaluation device 14. The light source 11 and the camera 13 are respectively designed in line shape and are arranged next to one another. They can be moved up and down in the vertical direction via a movement mechanism (not shown) so that light radiated from the light source 11 completely covers a predetermined scan region 15 (FIG. 2) and the light reflected by a document in the area of a scan region 15 is received by the camera 13.

The camera 13 is, for example, a CCD line sensor unit that outputs a digital image data signal. The image data signal is processed further in the microprocessor-controlled electrical evaluation device 14.

Instead of the camera 13 in the form of a CCD line sensor unit, an areal sensor can also be used. Given the use of an areal sensor it is appropriate that neither the areal sensor nor the light source is moved since the design of the overall scanner is thereby simplified.

In the present exemplary embodiment the glass plate 2 borders the scan area 15. An antenna 16 running around the scan area 15 is arranged below the glass plate 2 and outside of the scan area 15. The antenna 16 is connected with a transmission and reception device 17 for transmission and reception of RFID signals. Transponders of the type ISO 14443 can be read and written to with this transmission and reception device 17.

Figure 3:
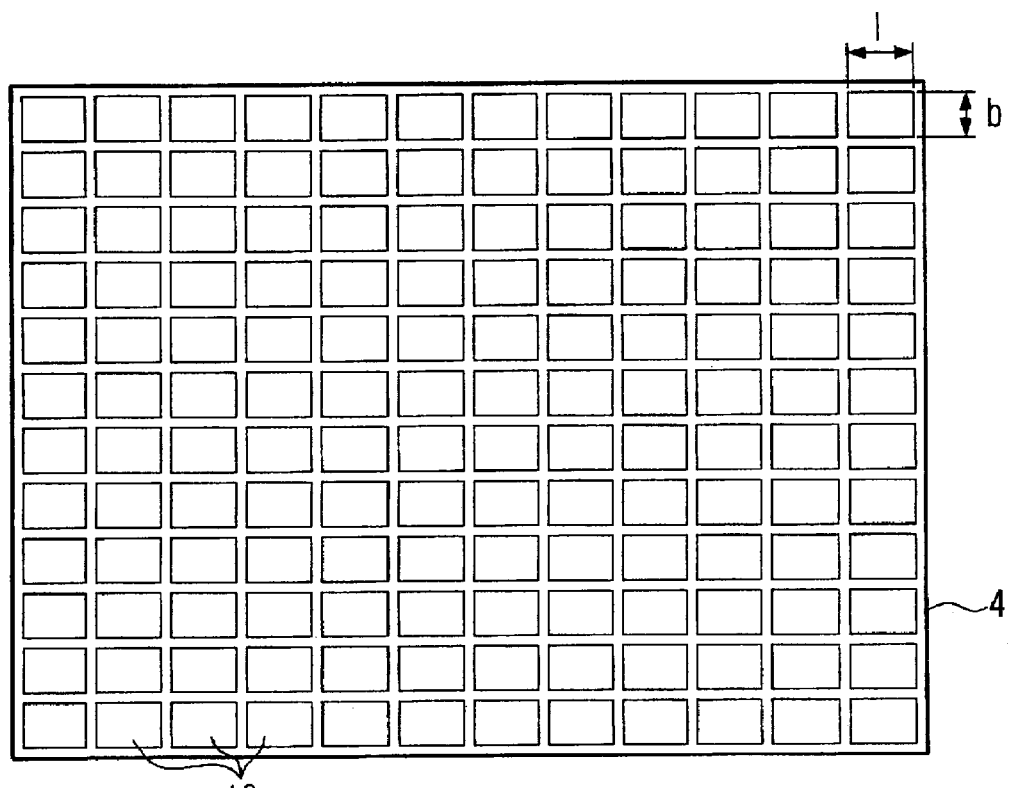
FIG. 3 illustrates a mirror in which a plurality of rectangular mirror elements are schematically drawn.

The metal layer 6 of the mirror 4 is divided into a plurality of mirror segments. FIG. 3 shows a mirror 4 with rectangular mirror segments 18. The width b of the mirror segment is 10 mm and the length l is approximately 15 mm. The individual mirror segments are spaced from one another such that they form respective electrically separated individual mirror surfaces. The distance between two adjacent mirror segments 18 is advantageously 20 µm to 50 µm given a resolution of the scanner of 320 dpi.

Due to the formation of such small mirror segments, no eddy currents arise that impair the radio waves emitted or received by the antenna 16. It has been shown that the mirror segments can be formed with a width of up to approximately 15 mm and a length l of approximately 20-30 mm without an appreciable impairment of the radio waves occurring. It is hereby to be considered that the greater the selected width b, the smaller the length l should be or the greater the selected length l, the smaller the width b. The mirror segments 18 are merely schematically drawn in FIG. 3. They are actually not detectable on the mirror with the naked eye, or at most the intermediate regions between the mirror segments 18 are detectable as a very slightly pronounced grid structure that are somewhat darker than the remaining region of the mirror 4. These somewhat darker intermediate regions can be corrected in the electronic evaluation device 14 via a corresponding filter. This filter is a conventional filter for light/dark equalization that is generated immediately after the manufacture of the scanner via scanning of a uniformly white sheet. No optical information is lost due to the provision of the intermediate regions 19 between the individual mirror segments; the light intensity in this intermediate region is merely somewhat weaker.

Figure 4:
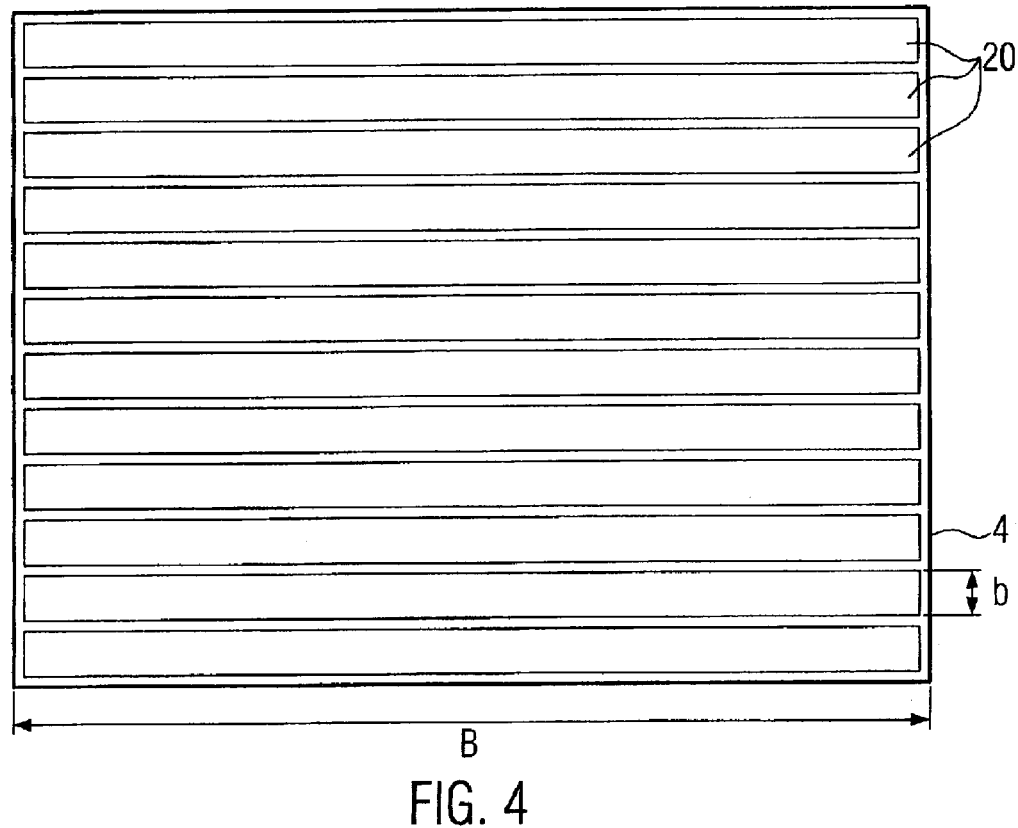
FIG. 4 shows a mirror in which a plurality of band-shaped mirror elements are schematically drawn.

FIG. 4 shows a further exemplary embodiment of a mirror 4 in which band-shaped mirror segments 20 are schematically depicted. The length l of the mirror segments 20 corresponds to almost the entire width B of the mirror 4. The width b of the mirror segment 20 is approximately 5 mm. This width advantageously likes in the range from 2 mm to 10 mm. The band-shaped mirror segments 20 are arranged perpendicular to the boundary edges 8 or 9 and therewith also perpendicular to the antenna 16 adjoining these (above right in FIG. 1). Since the band-shaped mirror segments 20 run perpendicular to the adjacent antenna 16, an impairment of the radio waves by eddy currents is prevented.

The radio waves are also not appreciably impaired with this mirror, such that an electrical scanning of a transponder by means of the antenna 16 is possible. However, the embodiment according to FIG. 3 with small rectangular mirror segments is more effective than the embodiment according to FIG. 4, with which a certain attenuation of the radio waves is accepted.

Independent of the shape of the mirror segments, the principle of the present preferred embodiment is to divide up the metal layer of a mirror into a plurality of segments, whereby the individual segments are electrically separated from one another and no eddy currents that significantly impair the radio waves can arise. It is hereby possible that a document that comprises a transponder can be placed on the glass plate, whereby the document is simultaneously scanned optically and electrically with the optical scanning device 10 and by means of the antenna 16. The data determined via the electrical scanning are combined together with the image data into a data unit that is relayed to a further processing station in the scanner. At the processing station the data and image data comprised in the data unit can be read or considered by a user or be automatically compared with a corresponding database.

The above exemplary embodiment comprises a mirror with a metal layer. In principle it is also possible to provide a reflecting dielectric layer on the mirror instead of a metal layer. Such a dielectric layer has no influence whatsoever on the radio waves. It can therefore be applied continuously on the mirror substrate. However, it is significantly more expensive than a metal layer, which is why the provision of the metal layer divided into mirror segments is preferred.

The preferred embodiment can be briefly summarized according to the following:

The scanner comprises a mirror below a glass plate in order to deflect light from an optical scanning device onto a document lying on the glass plate or to relay light signals reflecting from the document to the optical scanning device. According to the preferred embodiment of the invention the mirror is a metallic mirror whose metal layer is divided into individual mirror segments. The mirror segments hereby form only small contiguous electrical surfaces that do not impair radio waves. An electrical scanning device for transmission and reception of radio waves can therefore also be provided in this scanner in order to read out a transponder comprised in a document.

While a preferred embodiment has been illustrated and described in detail in the drawings and foregoing description, the same is to be considered as illustrative and not restrictive in character, it being understood that only the preferred embodiment has been shown and described and that all changes and modifications that come within the spirit of the invention both now or in the future are desired to be protected.

I claim as my invention:

1. A scanner for optical and electrical scanning of a document having a transponder, comprising:
    an optical scanning device that scans the document lying on a glass plate via a mirror arranged below the glass plate;
    at least one antenna for transmission of electromagnetic signals to the transponder and for reception of electromagnetic signals from the transponder; and
    the mirror comprising an optically reflective metal layer, the metal layer being divided into separate mirror segments.

2. A scanner according to claim 1 wherein the metal layer individual mirror segments are spaced not further than 100 mu m from one another.

3. A scanner according to claim 1 wherein the metal layer mirror segments are shaped like bands and exhibit a maximum width of 10 mm, and the band-shaped mirror segments run perpendicular to the antenna arranged adjacent to the mirror.

4. A scanner according to claim 1 wherein the metal layer mirror segments comprise rectangles and exhibit a maximum width of 15 mm and a maximum length of 15 mm.

5. A scanner according to claim 1 wherein the mirror is arranged with a boundary edge adjacent to a boundary edge of the glass plate and the mirror and the glass plate encompass an angle in a range from 40 degrees to 70 degrees.

6. A scanner according to claim 1 wherein the antenna is arranged below the glass plate and laterally offset with regard to an optical scanning region.

7. A scanner according to claim 6 wherein the scanner comprises a plurality of antennas arranged on two opposite sides of the optical scanning region.

8. A scanner according to claim 6 wherein the antenna is formed from a rectangular body arranged around the scanning region.

9. A scanner according to claim 1 wherein the antenna is connected with a transmission and reception device for transmitting and receiving RFID signals.

10. A scanner according to claim 1 wherein the optical scanning device comprises a digital image generator.

11. A scanner for optical and electrical scanning of a document having a transponder, comprising:
    an optical scanning device that scans the document lying on a glass plate via a mirror arranged below the glass plate;
    at least one antenna for transmission of electromagnetic signals to the transponder and for reception of electromagnetic signals from the transponder; and
    the mirror comprising an optically reflective metal layer, the metal layer being divided into separate mirror segments;
    wherein the optical scanning device comprises a digital image generator;
    wherein the digital image generator comprises a correction device with which a brightness generated image is automatically corrected in order to compensate for brightness differences caused by separations of the separate mirror segments.

12. A scanner for optical and electrical scanning of a document having a transponder, comprising:
    a glass plate for placement of the document;
    an optical scanning device that scans the document lying on the glass plate via a mirror arranged below the glass plate;
    at least one antenna for transmission of electromagnetic signals to the transponder and for reception of electromagnetic signals from the transponder; and said mirror comprising a continuous dielectric layer.

13. A scanner for optical and electrical scanning of a document having a transponder, comprising:
    the glass plate receiving the document;

an optical scanning device that scans the document lying on the glass plate via a mirror arranged at an angle below the glass plate;

an antenna at least partially surrounding said glass plate which transmits electromagnetic signals to the transponder and receives electromagnetic signals from the transponder; and the mirror comprising an optically reflective metal layer, the metal layer being divided into separate mirror segments to disrupt currents which may be caused by said received or transmitted electromagnetic signals.

* * * * *